(12) United States Patent
Rosenfellner

(10) Patent No.: US 11,999,572 B2
(45) Date of Patent: Jun. 4, 2024

(54) CONVEYING A MATERIAL TO BE CONVEYED

(71) Applicant: Primetals Technologies Austria GmbH, Linz (AT)

(72) Inventor: Gerald Rosenfellner, Ertl (AT)

(73) Assignee: Primetals Technologies Austria GmbH, Linz (AT)

( * ) Notice: Subject to any disclaimer, the term of this patent is extended or adjusted under 35 U.S.C. 154(b) by 0 days.

(21) Appl. No.: 17/627,715

(22) PCT Filed: Jul. 14, 2020

(86) PCT No.: PCT/EP2020/069886
§ 371 (c)(1),
(2) Date: Jan. 17, 2022

(87) PCT Pub. No.: WO2021/009171
PCT Pub. Date: Jan. 21, 2021

(65) Prior Publication Data
US 2022/0250849 A1  Aug. 11, 2022

(30) Foreign Application Priority Data
Jul. 15, 2019 (EP) .................................... 19186311

(51) Int. Cl.
*B65G 17/06* (2006.01)
*B65G 21/08* (2006.01)
*F27B 9/24* (2006.01)

(52) U.S. Cl.
CPC .......... *B65G 17/063* (2013.01); *B65G 21/08* (2013.01); *F27B 9/24* (2013.01); *F27B 9/243* (2013.01)

(58) Field of Classification Search
CPC .......... F27B 9/24; F27B 9/243; B65G 17/063; B65G 21/08; F27D 1/00; F27D 3/00
See application file for complete search history.

(56) References Cited

U.S. PATENT DOCUMENTS 1,895,072 A * 1/1933 Fenton .................... C21D 9/00
  432/235
4,062,459 A * 12/1977 Robertson .............. F27B 9/243
  432/239

(Continued)

FOREIGN PATENT DOCUMENTS

AT        502904 A1   6/2007
CN      106044058 A  10/2016

(Continued)

OTHER PUBLICATIONS

EPO, JP2000249472A Translatioon (Year: 2023).*

(Continued)

*Primary Examiner* — Mark A Deuble
(74) *Attorney, Agent, or Firm* — Liang & Hennessey LLP; Brian Hennessey

(57) ABSTRACT

The invention relates to a conveying system for conveying a material to be conveyed along a conveying path. The conveying system includes a conveying chamber in which the conveying path is arranged. At least one component of a conveying mechanism for conveying the material to be conveyed is arranged outside the conveying chamber. The conveying mechanism includes a traction drive having at least one traction element by means of which carrying elements can be moved in order to convey the material to be conveyed. The carrying elements are arranged in the conveying chamber and protrude through a through-opening out of the conveying chamber. Inside the conveying chamber and/or in the region of the through-opening, the surfaces of the carrying elements are at least partially provided with a thermal insulation material.

13 Claims, 10 Drawing Sheets

(56) References Cited

U.S. PATENT DOCUMENTS

| | | | |
|---|---|---|---|
| 5,028,250 A | 7/1991 | Deb et al. | |
| 7,228,960 B2* | 6/2007 | Muller | C21B 13/0086 |
| | | | 198/860.3 |
| 7,578,380 B2 | 8/2009 | Brinkmeier et al. | |
| 10,215,510 B2* | 2/2019 | Seidel | B21B 45/008 |
| 10,947,050 B2* | 3/2021 | Rosenfellner | B65G 21/08 |
| 2015/0274427 A1* | 10/2015 | Butland | B65G 17/067 |
| | | | 198/849 |
| 2015/0368045 A1* | 12/2015 | Hentschel | B65G 17/38 |
| | | | 198/494 |

FOREIGN PATENT DOCUMENTS

| | | |
|---|---|---|
| DE | 102014114575 A1 | 12/2015 |
| EP | 3401628 A1 | 11/2018 |
| FR | 2255820 A5 | 7/1975 |
| JP | S56160957 U | 11/1981 |
| JP | 2000249472 A | 9/2000 |
| KR | 101636417 B1 | 7/2016 |
| RU | 2090523 C1 | 9/1997 |
| RU | 2286396 C2 | 10/2006 |

OTHER PUBLICATIONS

International Search Report and Written Opinion received in International Application No. PCT/EP2020/069886 dated Sep. 17, 2020, 16 pages.

European Search Report received in European Application No. 19186311.7 dated Jan. 23, 2020, 9 pages.

Russian Office Action received in Russian Application No. 2022100609 dated Oct. 31, 2023, 9 pages.

* cited by examiner

CONVEYING A MATERIAL TO BE CONVEYED

CROSS-REFERENCE TO RELATED APPLICATIONS

The present application is a national phase application of PCT Application No. PCT/EP2020/069886, filed Jul. 14, 2020, entitled "CONVEYING A MATERIAL TO BE CONVEYED", which claims the benefit of European Patent Application No. 19186311.7, filed Jul. 15, 2019, each of which is incorporated by reference in its entirety.

BACKGROUND OF THE INVENTION

1. Field of the Invention

The invention relates to a conveying installation.

2. Description of the Related Art

For moving hot materials, in particular in the metallurgical industry, hot conveyors are used.

In particular, the invention relates to the conveyance of reactive and/or hot and/or abrasive material for conveying. A reactive material for conveying is to be understood here to mean a material for conveying which reacts chemically and/or physically with environmental substances surrounding the conveying installation, for example with air, in particular with the oxygen of the air. In the conveyance of such material for conveying, various demands are placed on a conveying installation. In the conveyance of hot material for conveying, the conveying mechanism of the conveying installation is also subjected to high temperatures, such that it must be cooled or must be manufactured from expensive heat-resistant materials. In the conveyance of reactive material for conveying, it is possible, for example as a result of chemical reactions of the material for conveying with, for example, oxygen from the environment, for harmful and/or environmentally damaging gas to escape from the material for conveying, and/or the material for conveying can heat up intensely as a result of the reactions, which can lead to material damage to the material for conveying and/or to safety problems. In order to prevent the contact of reactive material for conveying, for example, with oxygen, use is often made of an inert gas, for example nitrogen, in order to keep oxygen out of the environment of the material for conveying. Furthermore, in the conveyance of material for conveying, dust often forms, which can likewise have a harmful and/or environmentally damaging effect and/or can be detrimental to sub-components of the conveying installation, and which must be extracted and disposed of.

SUMMARY OF THE INVENTION

The invention is based on the object of specifying an improved conveying installation.

The object is achieved according to the invention by a conveying installation having the features of the claims.

Advantageous refinements of the invention are the subject matter of the dependent claims.

A conveying installation according to the invention for conveying a material for conveying along a conveying path has a conveying chamber, through which the conveying path runs.

At least one component of a conveying mechanism for conveying the material for conveying is arranged at least outside the conveying chamber. This advantageously makes it possible for sensitive components of the conveying mechanism to be arranged not in the conveying chamber but rather outside the latter and to thus be removed from the influence of high temperatures, dust and/or corrosive gases in the conveying chamber. In other words, components of the conveying mechanism can be protected against the often adverse fluid atmosphere in the conveying chamber by being relocated out of the latter.

The conveying mechanism has a traction mechanism drive having at least one traction mechanism by means of which carrier elements are movable in order to convey the material for conveying. The material for conveying is transported, for example, directly by the carrier elements or in containers arranged on the carrier elements. The carrier elements are arranged in the conveying chamber and protrude through a passage opening out of the latter. Traction mechanism drives and carrier elements moved therewith are particularly readily suitable, inter alia because of their robustness and their low need for maintenance, for transporting reactive, hot and/or abrasive material for conveying. The arrangement of a traction mechanism outside the conveying chamber, for example in a secondary chamber, protects the traction mechanism against high temperatures, dust and/or corrosive fluids in the conveying chamber.

The term conveying mechanism can be understood to mean all installation parts which serve for transmitting conveying energy to the material for conveying. This may also include an optionally used container for the material for conveying.

The conveying mechanism can have drive wheels which conventionally sit on a shaft. Bearings and lubricants can be provided for the shaft and drive wheels. Furthermore, at least one motor and at least one transmission can be provided for the drive.

Carrier elements can be formed integrally or else can be composed of a plurality of elements. They can be manufactured from just one material. However, this is unnecessary.

According to the invention, parts of the conveying installation are at least partially provided with a thermally insulating material at least within the conveying chamber and/or in the region of the passage opening. The thermal insulation material serves for thermal insulation. Thermal insulation should be understood to mean a reduction in the passage of thermal energy, for example for the purpose of protecting the thermally insulated part or chamber against heating or cooling. Suitable thermal insulation material are those materials which are stable for temperatures above the temperature of the material for conveying and can achieve thermal insulation. Materials suitable for thermal insulation have a low thermal conductivity; the coefficient of thermal conduction is typically below 1 W/(K*m).

The thermal insulation material is intended to prevent the transmission of heat from hot material for conveying to the conveying mechanism. The heat flow of the hot material for conveying is prevented as a result of the thermal resistance of the thermal insulation material. Thermal insulation material can be used to prevent thermal energy from flowing out of hotter components, and it can be used to prevent the penetration of thermal energy into colder components.

Examples of suitable thermal insulation material include fire spraying compounds, refractory concrete, molded parts having low thermal conductivity, thermal insulation blocks, fire clay, or else material on the basis of fibers, such as ceramic fibers or rock wool, or insulation material on a calcium-magnesiumsilicate basis—in particular these can be fiber mats which are simple to install. The thermal insulation material can be constructed in one layer or in multiple layers.

In one embodiment, a separating surface between a surface of the conveying chamber within the conveying chamber and at least one adjacent outer surface of the conveying chamber is at least partially provided with the thermal insulation material.

In one embodiment, the surfaces of the conveying chamber are at least partially provided with the thermal insulation material toward an environment.

If a housing is provided, the housing does not necessarily have to be insulated, but this is expedient because of: (a) contact protection, and (b) minimizing the overall losses.

The solution according to the invention makes it possible to shift the maximum temperature in the direction of the heat source or, in other words, to insulate against the heat flow within a region.

For example, the insulation begins at the passage opening of the carrier elements and proceeds in the direction of the containers (buckets). As a result, the heat flow is prevented from penetrating the carrier element.

The penetration surface for heat becomes smaller here. If the entire surface of the carrier element is provided with insulation, only a connection piece to the container remains as a thermal conductor. In this case, for example, a material having a low coefficient of thermal conduction can be selected for the connection piece, and/or a thermal resistance can be provided at a connecting point of the connection piece to the carrier element or from the container to the connection piece and/or the container can be insulated.

However, the heat source itself may likewise also be insulated.

Even if the conveying chamber is already insulated to the outside, components in the interior of the conveying chamber can be insulated once again. For example, in the conveying chamber, it is possible to at least partially insulate the carrier elements (preferably completely) and/or the containers, if present.

This approach has hitherto not been within the sights of a person skilled in the art since the external insulation can be reinforced in a simple manner. However, with the proposed variant, the temperature at the traction mechanism, for example chains, can be substantially reduced. For this purpose, however, it is not the traction mechanism itself which is thermally insulated (which would be very complicated), but rather the temperature reduction at the traction mechanism is achieved by thermal insulation of other parts, in particular the carrier elements and/or containers. Since the carrier elements are moved, a heat flow is also moved together with the carrier elements. In an ideal case, a carrier element can be insulated without gaps, in contrast, for example, to the insulation of a wall of the conveying chamber that has the at least one passage opening.

The insulation with respect to the environment is advantageous for minimizing the risk of burns upon contact.

According to the invention, surfaces of the carrier elements are at least partially provided with a thermal insulation material at least within the conveying chamber and/or in the region of the passage opening. Alternatively or additionally, at least one container for receiving the material for conveying is arranged on at least one of the carrier elements, wherein a surface and/or inner surface of the container is at least partially provided with a thermal insulation material.

If hot material for conveying is intended to be transported, the material of the carrier elements of the conveying installation is heated by conduction of heat out of the material for conveying and, as a further consequence, conducts heat into the traction mechanisms which may comprise, for example, at least one chain. The temperature at the traction mechanism and/or at the bearings and/or at the carrier elements thus increases to such an extent that very expensive materials would have to be used for the bearings or traction mechanisms. If certain temperatures are exceeded, there are no longer any suitable materials for this purpose.

By means of the thermal insulation material used on surfaces of the carrier elements within the conveying chamber and/or in the region of the passage opening, the heat input into the carrier elements from hot material for conveying is reduced, and therefore thermal loading of the bearings and traction mechanisms is also reduced.

The reliability of the conveying installation is thereby improved.

In one embodiment, it is possible for also or only the containers for receiving the material for conveying to be provided with thermal insulation material in order to obtain thermal insulation ideally as far as the heat source, that is to say the hot material for conveying. In this way, as low a temperature as possible of the carrier elements can already be achieved in the interior of the conveying chamber.

If, however, only the containers, but not the carrier elements, are provided with thermal insulation material, although the transfer of heat from the container to the carrier elements by thermal conduction and thermal radiation is reduced within the conveying chamber, but the heat input by convection from the upwardly open containers is not.

If the heat source is not itself insulated, the thermal insulation of the carrier elements which are readily thermally conductive (for example steel or cast iron) already minimizes the heat input into the carrier elements in the conveying chamber, in particular if the thermal insulation of the carrier elements within the conveying chamber is designed to be virtually complete.

For example, the entire surface of the carrier elements within the conveying chamber and in the region of the passage opening can be provided with the thermal insulation material, as a result of which direct contact of the material of the carrier elements, that is to say of the main construction material of the carrier, with the atmosphere of the hot conveying chamber is avoided. The maximum temperature of the main construction material of the carrier is therefore located behind a thermal insulation material, as a result of which the inlet temperature for the thermal conduction in the main construction material of the carrier is substantially reduced.

Since the thermal conductivity of the main construction material of the carrier is high, by lowering the maximum temperature of the main construction material of the carrier, the temperature at the traction mechanism, for example the conveying chain, is directly lowered, for example by up to 150° C. A thermal insulation at the location remote from the conveying chain therefore has a direct influence on the temperature of the conveying chain.

Similarly, the surface of the carrier elements in the region of the passage opening and optionally in an adjoining region within the conveying chamber can be provided with the thermal insulation material, and therefore the entire surface of the carrier elements within the conveying chamber is not provided with the thermal insulation material.

In one embodiment, at least one secondary chamber is provided which is connected to the conveying chamber by the at least one passage opening, wherein the carrier elements protrude through the at least one passage opening into the at least one secondary chamber and the traction mechanism is arranged in at least one of the secondary chambers.

The arrangement of components of the conveying mechanism in a secondary chamber permits these components to be cooled relatively simply in the secondary chamber, for example by means of fluid conducted into the secondary chamber and/or by means of a separate cooling device.

When the conveying chamber is separated from a secondary chamber, in which at least one traction mechanism is arranged, by the carrier elements, the carrier elements, in addition to transporting the material for conveying, can be used at the same time for partitioning off the secondary chamber from the conveying chamber. When a traction mechanism is arranged in a secondary chamber, which is arranged to the side of the conveying chamber, the traction mechanism is separated spatially further from the material for conveying, which is advantageous in particular for the transport of hot material for conveying, since the traction mechanism in this case is less greatly heated by the material for conveying and therefore also has to be cooled less intensely.

The surfaces of the secondary chambers can now still only be connected to the conveying chamber via thermally insulated surfaces, as a result of which the heat input into the atmosphere of the secondary chamber can be kept small.

In one embodiment, surfaces of the carrier elements outside the conveying chamber are not provided with a thermal insulation material. This facilitates the irradiation of heat from the carrier elements outside the conveying chamber and can thus reduce the heat input into traction mechanisms and bearings.

The ratio of the contact surface common with the conveying chamber to the remaining surface is therefore reduced.

Even if the surface of the main construction material of the carrier in the conveying chamber is not fully insulated, the temperature in the region of the traction mechanisms, for example chains, bearings and wheels, is reduced since the thermal performance is substantially reduced by the noninsulated surface.

Although the material of the carrier elements themselves does not require any insulation in the conveying chamber, it is nevertheless insulated there. By reducing the maximum temperature of the material of the carrier elements in the interior, the heat flow in the direction of the secondary chamber is reduced.

By increasing the insulation surface into the conveying chamber, the thermal conduction by the material of the carrier elements is reduced, thus affording the following advantages:
a). substantially lower thermal conduction output by the material of the carrier elements,
b). lower temperature of the material of the carrier elements, as a result of which cost-effective materials can be used for the highly loaded carrier elements,
c). the mechanical properties of the materials of the carrier elements are greatly improved since the peak temperatures are lowered,
d). lower heat input into the secondary chamber, as a result of which the material temperatures of all of the parts in the secondary chamber are reduced. Cost-effective materials can be used for the costly chains and/or wheel bearings,
e). conveying chains can absorb higher maximum tensile forces or lighter conveying chains can be used,
f). in the event of a conveying failure, forced cooling is unnecessary,
g). lubricating the wheel bearings is substantially simpler since the bearing temperatures are low, and
h). substantially longer service lives because of a lower operating temperature.

In one embodiment, the surfaces of the carrier elements outside the conveying chamber are likewise at least partially provided with a thermal insulation material.

A partial quantity of the heat which penetrates the carrier element in the vicinity of a heat source, for example hot material for conveying, for example in the conveying chamber, will leave the carrier element at a greater distance from the heat source, for example hot material for conveying, —for example outside the conveying chamber—where lower temperatures prevail, i.e. the carrier element is cooled there.

Overall, when the heat input into the carrier element is reduced, the temperature of the carrier element will be lower—within and outside the conveying chamber, which is beneficial as regards the mechanical stability and load-bearing capacity. In addition, the thermal loading of components connected to the carrier element is reduced, and therefore there is a reduction in thermally induced wear for them.

Heat losses, which are reduced by thermal insulation material, from the hot material for conveying are also advantageous if, for the following processing steps, as high a temperature as possible is desired—for example when transporting hot direct reduced iron (DRI) to an electric arc furnace (EAF), a higher temperature of the supplied DRI will mean a lower requirement for heating in the EAF.

In one refinement of the invention, the secondary chamber has a fluid atmosphere differing physically and/or chemically from a fluid atmosphere in the conveying chamber. The at least one passage opening and the fluid atmospheres in the conveying chamber and in the at least one secondary chamber can be designed for setting a defined fluid flow in the installation housing. It may suffice to favorably influence the natural movement of the fluid flow (natural draft) in respect of the environmental conditions of the chains and wheels, for example by keeping out or minimizing dust, lowering the temperature, improving temperature-dependent characteristic values of the materials, keeping out harmful fluids, for example air, etc.

A fluid atmosphere in a chamber is to be understood to mean the chemical and physical characteristics, for example the chemical composition, the pressure or the temperature, of a fluid that is situated in the chamber. A fluid is to be understood to mean a gas or a liquid.

The conveying installation thus permits a defined fluid flow in an installation housing of the conveying installation. This is achieved by means of a division of an installation housing into a conveying chamber and at least one secondary chamber, which have mutually different fluid atmospheres and which are connected by at least one passage opening. The arrangement of the conveying path in a conveying chamber permits a substantial encapsulation of the conveying path with respect to the environment, such that the material for conveying is substantially partitioned off with respect to environmental substances and in particular oxygen from the environment. The setting of a defined fluid flow by means of the mutually different fluid atmospheres in the conveying chamber and in the at least one secondary chamber additionally makes it possible for environmental substances and in particular oxygen to be kept out of the region of the material for conveying, and permits the defined discharge of harmful and/or environmentally damaging gases and dust out of the conveying chamber with the fluid flow.

One refinement of the invention provides for the installation housing to have at least one fluid inlet and at least one fluid outlet and to be of fluid-tight design or approximately of fluid-tight design aside from the at least one fluid inlet and the at least one fluid outlet. Fluid-tightness is to be understood here to mean fluid-tightness that satisfies a technical specification. By means of this substantially fluid-tight design of the installation housing, an escape of fluid from the installation housing is restricted to the fluid outlets, such that an only relatively small amount of fluid escapes from the installation housing. Furthermore, the emergence of fluid through the defined fluid outlets makes it possible for fluid that emerges from the installation housing to be targetedly at least partially collected and fed back to the installation housing. In this way, the consumption and the costs of the fluid used are advantageously reduced. The substantially fluid-tight design of the installation housing furthermore advantageously reduces the ingress of environmental substances surrounding the conveying installation into the installation housing. It often suffices if the housing is approximately fluid-tight. Complete gas-tightness is not always required. On the contrary, permitted leakage rates may be specified for the respective application.

A further refinement of the invention provides for a conveying chamber end of the conveying chamber, which is arranged in the region of a conveying path start of the conveying path, to be closed or closable. In this way, the direction of the fluid flow can easily be aligned with the transport direction of the material for conveying.

In one refinement of the invention, the carrier elements at least partially separate the conveying chamber from a secondary chamber, in which at least one traction mechanism is arranged. The carrier elements here can be of such a wide design that they minimize the slot area along the passage opening. The carrier elements can be as wide as possible in the region of the passage opening without butting against one another. The carrier elements swing apart in the region of a diversion.

A further refinement of the invention provides for an opening width of at least one passage opening to vary along the course of the passage opening. Regions of a secondary chamber with relatively narrow passage openings are particularly advantageously suitable for the cooling of components, arranged there, of the conveying mechanism by means of fluid conducted into the secondary chamber, because particularly high fluid flows of the fluid arise in these regions. Furthermore, regions of a secondary chamber with relatively narrow passage openings are particularly advantageously suitable for the introduction of fluid into the secondary chamber, because less fluid flows from the secondary chambers into the conveying chamber in these regions than in regions with relatively wide passage openings, such that the introduced fluid can be distributed over greater regions of the secondary chamber. By contrast, regions with relatively wide passage openings are advantageously suitable for targetedly conducting relatively large amounts of fluid into the conveying chamber and thus more intensely influencing the fluid flow in the conveying chamber. Therefore, through targeted variation of the opening width of a passage opening, it is possible for suitable regions of the secondary chamber to be defined for the cooling of components of the conveying mechanism or of other components of the conveying installation, for example the above-stated carrier elements, for the positioning of fluid inlets and for the influencing of the fluid flow in the installation housing.

A further refinement of the invention provides a cooling device for cooling at least one secondary chamber. In this way, it is possible in particular for components of the conveying mechanism that are arranged in the secondary chamber to be cooled when cooling by means of the fluid is not provided or is not sufficient.

A further refinement of the invention provides a fluid infeed or a fluid circuit system which comprises at least one secondary chamber and which is configured for conducting a fluid through at least one passage opening between the secondary chamber and the conveying chamber, for example from the secondary chamber into the conveying chamber, or vice versa. By means of such a fluid circuit system, it is advantageously possible for the consumption of fluid to be further lowered, because fluid discharged from a secondary chamber is fed via the fluid circuit system back to a secondary chamber, such that said fluid remains in the fluid circuit system. In principle, a complete fluid circuit system is not absolutely necessary. In many cases, it suffices to feed in the fluid with which the pressure ratios that arise on the basis of the natural draft can be influenced in such a manner that they meet the requirements of the mechanical parts and/or of the material for conveying.

The fluid circuit system may have at least one heat exchanger for cooling a fluid fed to a secondary chamber. In this way, the fluid that is cooled by means of the heat exchanger and subsequently conducted into a secondary chamber can advantageously also be used for cooling components, arranged in the secondary chamber, of the conveying mechanism.

Furthermore, the conveying installation may have a fluid recycling unit for receiving fluid from the conveying chamber and feeding fluid back into the conveying chamber, wherein fluid may be fed back directly and/or via the fluid circuit system. The fluid recycling unit may have a fluid cleaning unit for cleaning the fluid received from the conveying chamber. In this way, fluid that emerges or is extracted from the conveying chamber can be at least partially collected and recycled by being fed back into the conveying chamber. Here, it is not necessary for fluid to be fed to the fluid recycling unit directly from the conveying chamber, it rather also being possible for fluid to be discharged from the conveying chamber into an apparatus connected downstream of the conveying installation, for example into a bunker into which the material for conveying is conveyed, and for said fluid to be fed from said apparatus to the fluid recycling unit. The consumption of fluid can furthermore advantageously be lowered in this way. Since fluid emerging or extracted from the conveying chamber often contains dust and/or gas that has escaped from the material for conveying, a fluid cleaning unit can be advantageous for cleaning the fluid that is received from the conveying chamber.

A further refinement of the invention provides a closed-loop control system for the closed-loop control of a fluid flow from at least one secondary chamber into the conveying chamber in a manner dependent on a pressure difference between a pressure in the secondary chamber and a pressure in the conveying chamber. In this way, the fluid flow can advantageously be set particularly accurately as required.

In a method according to the invention for operating a conveying installation according to the invention, a higher fluid pressure is set in each secondary chamber than in the conveying chamber. It is achieved in this way that fluid flows from each secondary chamber into the conveying chamber, and not in the opposite direction from the conveying chamber into a secondary chamber. The higher fluid pressure in each secondary chamber in relation to the conveying chamber, and the resulting fluid flow from each secondary chamber into the conveying chamber, advantageously also prevent the ingress of fluid that has escaped from the material for conveying, and/or of dust that has formed during the transport of the material for conveying, into a secondary chamber.

One refinement of the method provides that fluid from the conveying chamber is, by means of a fluid recycling unit, fed back into the conveying chamber directly and/or via at least one secondary chamber. In this way, the consumption of fluid can be advantageously lowered. In particular, provision may be made whereby fluid is cleaned in the fluid recycling unit before being fed back into the conveying chamber. In this way, it is advantageously possible to prevent dust and/or fluid that has escaped from the material for conveying to pass back into the conveying chamber with the fed-back fluid.

In a further embodiment, a fluid circuit system is not provided. This is made possible by the thermal insulation according to the invention of the carrier elements. By omitting the cooling circuit, costs can be saved.

In a further embodiment, surfaces of the carrier elements can be at least partially provided with the thermal insulation material both on their top side, which carries the hot material for conveying or the containers for receiving the hot material for conveying, and on their bottom side, in particular even if the bottom side is a hot region which may be located within the conveying chamber.

In an alternative embodiment, a conveying installation can also be provided without a conveying chamber, with the carrier elements being provided with thermal insulation material at least in a region which is adjacent to a container for receiving the hot material for conveying.

In an alternative embodiment, in a conveying installation with or without a conveying chamber, the carrier elements can be provided completely or virtually completely with a thermal insulation material. Although this reduces the heat input from the hot material for conveying into the carrier elements, it also prevents the thermal irradiation from the carrier elements.

In an alternative embodiment, in a conveying installation with or without a conveying chamber, the carrier elements can be formed in such a manner that the hot material for conveying or the containers intended for receiving the hot material for conveying are transported by a central region of the carrier element, which region is composed of a carrying material which is readily thermally conductive, for example steel or cast iron, wherein parts of the carrier element that are connected to the traction mechanisms, bearings and/or wheels are separated from the central region by intermediate parts of the carrier element, that are composed of thermal insulating material, in such a manner that only a small amount of heat passes from the central region into the traction mechanisms, bearings and/or wheels. However, the carrier elements that are of multi-part design in this way and have the intermediate parts composed of thermally insulating material have a weakness which is more susceptible to mechanical loadings and is also expensive for production.

BRIEF DESCRIPTION OF THE DRAWINGS

The above-described characteristics, features and advantages of this invention, and the manner in which these are achieved, will become clearer and more clearly understandable in conjunction with the following description of exemplary embodiments, which will be discussed in more detail in conjunction with the drawings, in which.

Parts which correspond to one another are denoted by the same reference designations in all of the figures.

DETAILED DESCRIPTION

Figure 1:
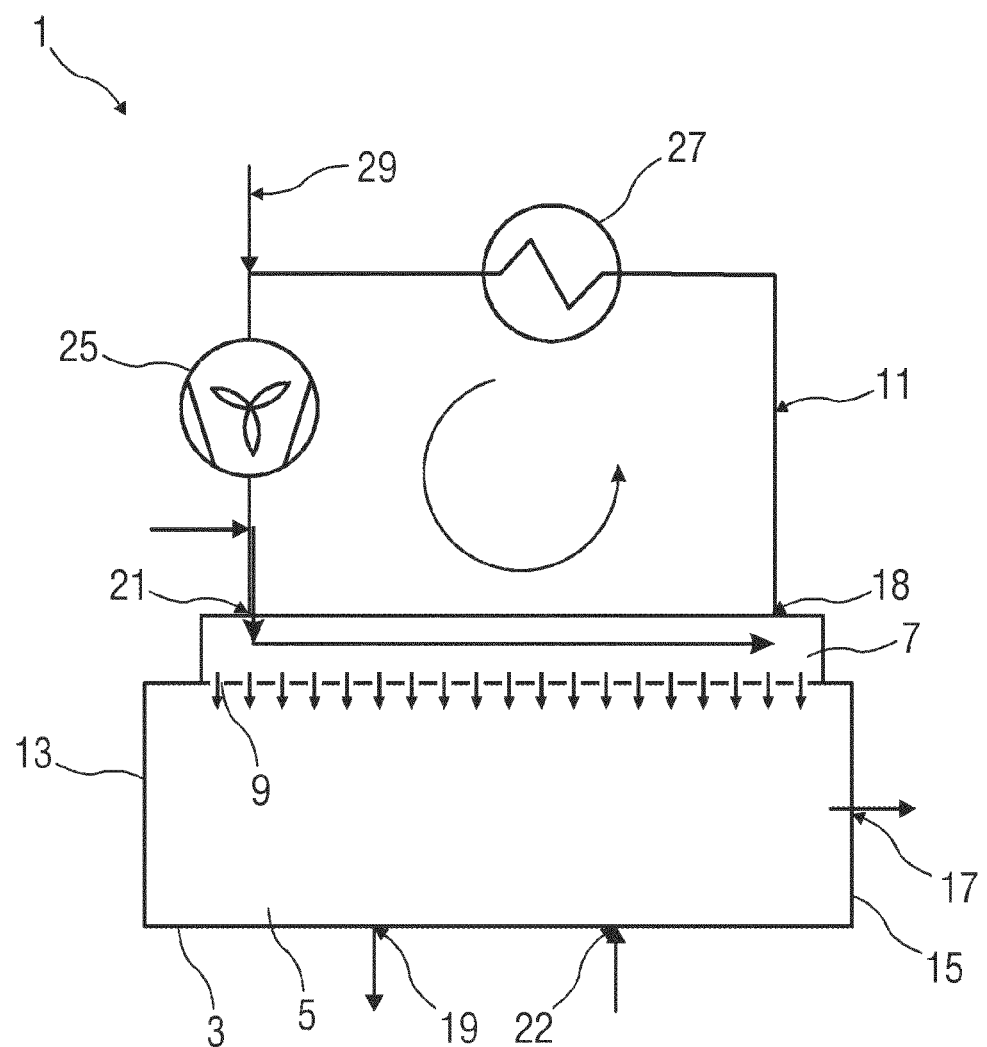
FIG. 1 schematically shows a first exemplary embodiment of a conveying installation with a first exemplary embodiment of a fluid circuit system, FIG. 2 schematically shows a second exemplary embodiment of a conveying installation.

FIG. 1 schematically shows a first exemplary embodiment of a conveying installation 1 for conveying a material for conveying along a conveying path. The conveying installation 1 comprises an installation housing 3, which has a conveying chamber 5 and a secondary chamber 7. At least the conveying path is arranged in the conveying chamber 5. The secondary chamber 7 is arranged laterally at the conveying chamber 5 and is connected to the conveying chamber 5 by multiple passage openings 9. Furthermore, the conveying installation 1 has a fluid circuit system 11 which comprises the secondary chamber 7 and which is designed for conducting a fluid, for example an inert gas, through the passage openings 9 from the secondary chamber 7 into the conveying chamber 5. Flow directions of the fluid are indicated in FIG. 1 by arrows. Instead of multiple passage openings 9, it is also possible for one continuous slot-like passage opening 9 to be provided.

The material for conveying is for example a reactive and/or hot and/or abrasive material for conveying. In particular, harmful and/or environmentally damaging fluid may escape from the material for conveying, which fluid therefore should not escape in uncontrolled fashion into the environment. Furthermore, dust may form during the transport of the material for conveying in the conveying chamber 5.

The conveying chamber 5 and the secondary chamber 7 have fluid atmospheres which differ physically and/or chemically. In particular, the fluid atmosphere in the secondary chamber 7 has a higher fluid pressure than the fluid atmosphere in the conveying chamber 5. It is achieved in this way that fluid flows through the passage openings 9 from the secondary chamber 7 substantially into the conveying chamber 5, and not in the opposite direction from the conveying chamber 5 into the secondary chamber 7. The fluid atmosphere in the conveying chamber 5 may, in particular in the case of a hot material for conveying, have a higher temperature than the fluid atmosphere in the secondary chamber 7, and/or may contain gas that has escaped from the material for conveying and/or may contain dust that forms during the transport of the material for conveying. The relatively high fluid pressure in the secondary chamber 7 and the resulting fluid flow from the secondary chamber 7 into the conveying chamber 5 advantageously also prevent the ingress of said gas and/or dust from the conveying chamber 5 into the secondary chamber 7.

The conveying path runs in the conveying chamber 5 between a first conveying chamber end 13 and a second conveying chamber end 15. In the region of the first conveying chamber end 13, material for conveying is introduced into the conveying chamber 5. At the second conveying chamber end 15, the material for conveying is discharged from the conveying chamber 5. The first conveying chamber end 13 is for example designed to be closed or closable, whereas the second conveying chamber end 15 has a first fluid outlet 17 through which fluid flows out of the conveying chamber 5, for example together with the material for conveying. The installation housing 3 furthermore has a second fluid outlet 18 through which fluid circulating in the fluid circuit system 11 is discharged from the secondary chamber 7. Furthermore, the installation housing 3 may have further fluid outlets 19 through which fluid can be extracted from the conveying chamber 5, for example if a fluid pressure in the conveying chamber 5 overshoots a pressure threshold value (such fluid outlets 19 may for example have in each case one safety element, for example a safety valve, for example if a safety study considers this to be necessary). The installation housing 3 furthermore has a first fluid inlet 21, through which fluid circulating in the fluid circuit system 11 is fed into the secondary chamber 7. Furthermore, the installation housing 3 may have further fluid inlets 22, through which fluid can be fed to the conveying chamber 5, for example in order to influence a fluid flow in the conveying chamber 5. Aside from the fluid outlets 17 to 19 and the fluid inlets 21, 22, the installation housing 3 is of fluid-tight design. In other exemplary embodiments, the first fluid inlet 21 and/or the second fluid outlet 18 may also be arranged at locations other than the locations of the secondary chamber 7 shown in FIG. 1, for example may be interchanged with one another in relation to FIG. 1.

By means of this substantially fluid-tight design of the installation housing 3, an escape of fluid from the installation housing 3 is restricted to the fluid outlets 17 to 19, such that an only relatively small amount of fluid escapes from the installation housing 3. Furthermore, fluid that has been discharged from the second fluid outlet 18 is fed back to the secondary chamber 7 through the fluid circuit system 11 via the first fluid inlet 21. Moreover, fluid emerging from the first fluid outlet 17 and/or from at least one further fluid outlet 19 may possibly be at least partially collected, fed to the fluid circuit system 11 (possibly after cleaning, in this regard see FIG. 2 and FIG. 8) and recycled. Altogether, it is thus possible for the amount of fluid to be fed to the installation housing 3 to be kept relatively low. In this way, the consumption of fluid and the costs for the fluid are advantageously reduced.

A further advantage of the substantially fluid-tight design of the installation housing 3 and of the higher fluid pressure in the secondary chamber 7 in relation to the conveying chamber 5 is that harmful and/or environmentally damaging fluid that has escaped from the material for conveying can likewise emerge from the conveying chamber 5 only at the fluid outlets 17, 19 and be disposed of there. The same applies to dust that is situated in the conveying chamber 5.

In the secondary chamber 7, there are arranged for example components of a conveying mechanism for conveying the material for conveying.

The fluid circuit system 11 conducts fluid through the secondary chamber 7, out of the secondary chamber 7 through the second fluid outlet 18, and, for example by means of pipelines, via a turbomachine 25 and optionally via a heat exchanger 27 and back into the secondary chamber 7 through the first fluid inlet 21. Furthermore, the fluid circuit system 11 has a fluid feed 29, through which fluid can be fed to the fluid circuit system 11, in particular in order to replace fluid that is discharged from the secondary chamber 7 into the conveying chamber 5 through the passage openings 9. The turbomachine 25 is a blower or a pump, depending on whether the fluid is a gas or a liquid. The optional heat exchanger 27 serves for cooling the fluid. It is advantageous in particular in cases in which a hot material for conveying is transported in the conveying chamber 5 and components, which are to be cooled, of a conveying mechanism for conveying the material for conveying are arranged in the secondary chamber 7. In these cases, the fluid conducted into the secondary chamber 7 and cooled by means of the heat exchanger 27 can advantageously also be used for cooling the components of the conveying mechanism arranged in the secondary chamber 7. Alternatively or in addition, the conveying installation may have a separate cooling device (not illustrated) for cooling the secondary chamber 7. For example, the cooling device may have a cooling pipe which is fillable with a coolant or multiple cooling pipes, wherein at least one cooling pipe may be situated within the secondary chamber 7.

Figure 2:
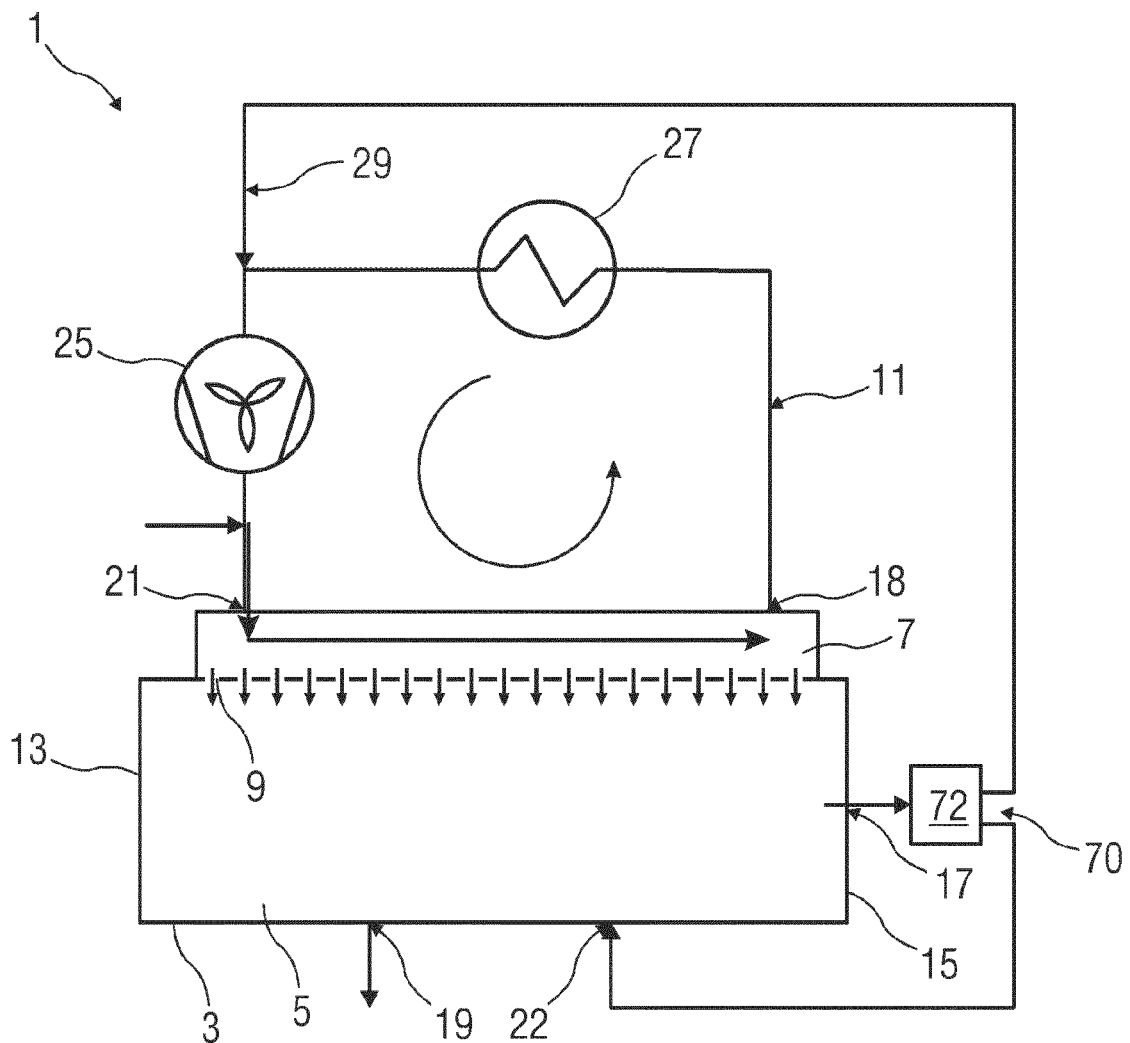

FIG. 2 schematically shows a second exemplary embodiment of a conveying installation 1. The conveying installation 1 differs from the exemplary embodiment illustrated in FIG. 1 substantially by a fluid recycling unit 70 for receiving fluid that emerges from the conveying chamber 5 through the fluid outlet 17. The fluid recycling unit 70 has a fluid cleaning unit 72 for cleaning the fluid that is received from the conveying chamber 5. A part of the cleaned fluid is fed back directly into the conveying chamber 5 via a fluid inlet 22. The other part of the cleaned fluid is fed back into the conveying chamber 5 indirectly by being fed to the fluid circuit system 11 via the fluid feed 29. In the ideal case, all of the fluid that emerges from the conveying chamber 5 is fed back into the conveying chamber 5, such that no further infeed of fluid into the conveying installation 1 is necessary.

Modifications of the exemplary embodiment shown in FIG. 2 may provide for the fluid recycling unit 70 to alternatively or additionally receive fluid emerging from the conveying chamber 5 from another fluid outlet 19. Furthermore, provision may be made whereby fluid is alternatively or additionally fed back directly into the conveying chamber 5 through the fluid outlet 17. Further modifications of the exemplary embodiment shown in FIG. 2 may provide for fluid to be fed back into the conveying chamber 5 either only indirectly via the fluid circuit system 11 or only directly. Furthermore, fluid may be fed to the fluid circuit system 11 at some other location instead of via the fluid feed 29, for example upstream of the heat exchanger 27, in order to cool the fluid. Furthermore, the fluid cleaning unit 72 may be omitted if cleaning of the fluid is not necessary.

Figure 3:
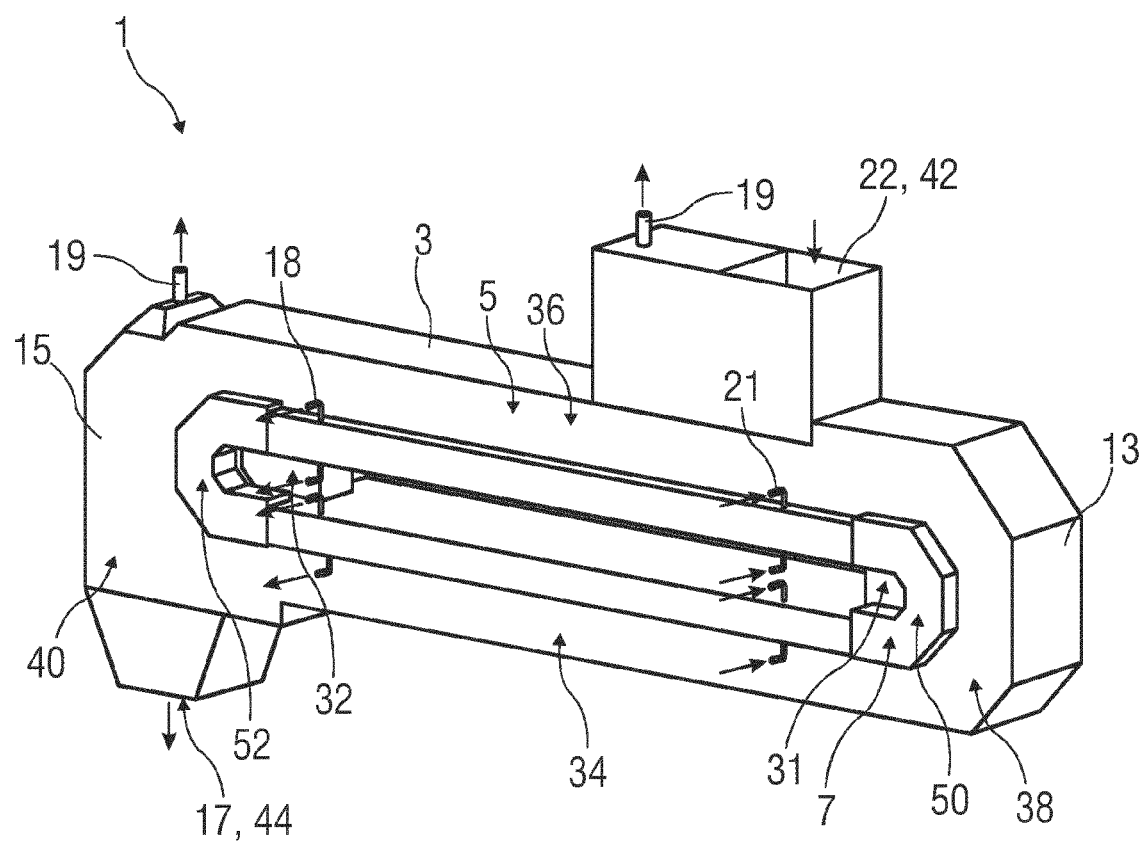
FIG. 3 shows a perspective illustration of a third exemplary embodiment of a conveying installation.
Figure 4:
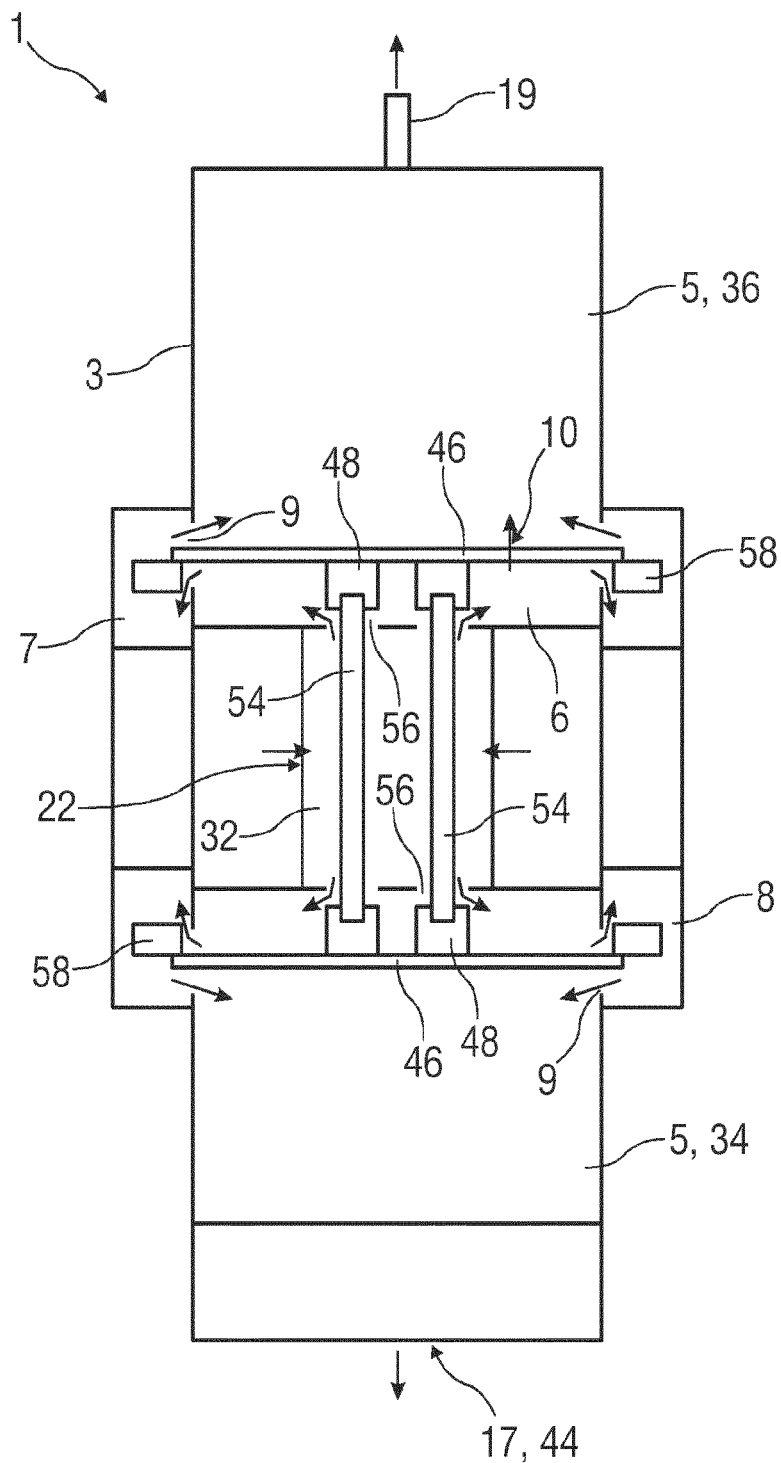
FIG. 4 shows a sectional illustration of the conveying installation illustrated in FIG. 3.

FIGS. 3 and 4 show a third exemplary embodiment of a conveying installation 1 for conveying a material for conveying along a conveying path. FIG. 3 shows a perspective view of the conveying installation 1. FIG. 4 shows a sectional illustration of the conveying installation 1.

The conveying installation 1 comprises an installation housing 3, which has a conveying chamber 5, three secondary chambers 6 to 8, and two additional chambers 31, 32.

The conveying chamber 5 is of ring-shaped form with two horizontally running horizontal portions 34, 36 and two vertically running diverting portions 38, 40. A lower horizontal portion 34 runs below and is spaced apart from an upper horizontal portion 36. The diverting portions 38, 40 form oppositely situated conveying chamber ends 13, 15 of the conveying chamber 5 and each connect the two horizontal portions 34, 36 to one another. The conveying path runs in the upper horizontal portion 36 of the conveying chamber 5 between a first conveying chamber end 13 formed by a first diverting portion 38 and a second conveying chamber end 15 formed by a second diverting portion 40. In the vicinity of the first conveying chamber end 13, the installation housing 3 has a charging inlet 42 which is arranged above the upper horizontal portion 36 and through which material for conveying is introduced into the conveying chamber 5. In the region of the second conveying chamber end 15, the installation housing 3 has a discharge opening 44 which is arranged below the second diverting portion 40 and through which material for conveying is discharged out of the conveying chamber 5.

The secondary chambers 6 to 8 are in each case likewise of ring-shaped form. The conveying chamber 5 runs around a first secondary chamber 6, wherein a bottom side of the upper horizontal portion 36, a top side of the lower horizontal portion 34 and the two diverting portions 38, 40 of the conveying chamber 5 join the first secondary chamber 6. A second secondary chamber 7 and the third secondary chamber 8 are arranged at different sides of the first secondary chamber 6 and in each case adjoin an outer side of the first secondary chamber 6 along the entire ring-shaped course thereof.

The conveying chamber 5 and the first secondary chamber 6 are separated from one another by carrier elements 46, by means of which the material for conveying is transported. The material for conveying is for example transported directly by means of the carrier elements 46 or in containers arranged on the carrier elements 46. The carrier elements 46 are designed for example as carrier plates. In the first secondary chamber 6, there are arranged traction mechanisms 48, which each run in encircling fashion within the first secondary chamber 6 along the ring-shaped course thereof and are connected to the carrier elements 46. The traction mechanisms 48 are for example designed as drive chains. With the traction mechanisms 48, the carrier elements 46 are movable along a closed path, which comprises the conveying path, in the installation housing 3.

Each traction mechanism 48 runs, below the upper horizontal portion 36 and above the lower horizontal portion 34 of the conveying chamber 5, rectilinearly between two diverting regions 50, 52 which are situated in each case in the region of one conveying chamber end 13, 15 and in which the traction mechanism 48 is diverted.

The traction mechanisms 48 are each driven by means of two drive wheels 54 which are arranged in each case in a diverting region 50, 52 of the traction mechanisms 48. The traction mechanisms 48 and drive wheels 54 form a traction mechanism drive, by means of which the carrier elements 46 are moved. One of the two additional chambers 31, 32 is arranged at each diverting region 50, 52, in which additional chamber the drive wheels 54 of said diverting region 50, 52 are arranged. Each additional chamber 31, 32 adjoins the first secondary chamber 6 and has, for each of the drive wheels 54 arranged therein, connecting openings 56 to the first secondary chamber 6, through which connecting openings the drive wheel 54 projects into the first secondary chamber 6.

The second secondary chamber 7 and the third secondary chamber 8 are connected in each case by means of a passage opening 9, which for example runs in ring-shaped encircling fashion and is of slot-like form, to the conveying chamber 5 and to the first secondary chamber 6. The carrier elements 46 project through said passage openings 9 into the second secondary chamber 7 and into the third secondary chamber 8. In the second secondary chamber 7 and in the third secondary chamber 8, there are arranged, in each case, guide wheels 58 by means of which the carrier elements 46 are guided. At least one secondary chamber 6 to 8 may furthermore additionally be connected by means of at least one further passage opening 10 to the conveying chamber 5. For example, further passage openings 10 between the first secondary chamber 6 and the conveying chamber 5 may be realized by means of gaps between the carrier elements 46.

Analogously to the first exemplary embodiment illustrated in FIG. 1, the installation housing 3 has fluid outlets 17 to 19 and fluid inlets 21, 22. A first fluid outlet 17 coincides for example with the discharge opening 44. Furthermore, the second secondary chamber 7 and/or the third secondary chamber 8 may have at least one second fluid outlet 18, and/or the conveying chamber 5 may have at least one further fluid outlet 19. Furthermore, the second secondary chamber 7 and/or the third secondary chamber 8 may have at least one first fluid inlet 21, and/or the conveying chamber 5 and/or the first secondary chamber 6 and/or at least one additional chamber 31, 32 may have at least one further fluid inlet 22, wherein, for example, the charging inlet 42 may be a fluid inlet 22.

As in the first exemplary embodiment illustrated in FIG. 1, the installation housing 3 is of fluid-tight design aside from the fluid outlets 17 to 19 and the fluid inlets 21, 22, resulting in the advantages already described above with regard to a reduced fluid amount requirement and a controlled discharge and disposal of gas and dust from the conveying chamber 5.

Furthermore, the conveying chamber 5 and the secondary chambers 6 to 8 have, as in the first exemplary embodiment illustrated in FIG. 1, fluid atmospheres which differ physically and/or chemically. In particular, the fluid atmospheres in each secondary chamber 6 to 8 connected to the conveying chamber 5 by means of at least one passage opening 9, 10 have a higher fluid pressure than the fluid atmosphere in the conveying chamber 5. It is achieved in this way that fluid, dust and gas that has escaped from the material for conveying do not flow directly out of the conveying chamber 5 into the secondary chambers 6 to 8, and flow in the conveying chamber 5 in a controlled manner to the fluid outlets 17 to 19. Furthermore, the components of the conveying mechanism that are arranged in the secondary chambers 6 to 8, in particular the traction mechanisms 48 and drive wheels 54, can be cooled by fluid that is conducted into the secondary chambers 6 to 8. The opening widths of the passage openings 9, 10 may vary along the courses of the passage openings 9, 10. For example, the slot-like passage openings 9 may be wider in the diverting regions 50, 52 of the traction mechanisms 48 than between the diverting regions 50, 52. Regions of the secondary chambers 6 to 8 with relatively narrow passage openings 9, 10 are particularly advantageously suitable for the cooling of components of the conveying mechanism that are arranged there in the secondary chambers 6 to 8, such as the traction mechanisms 48 and drive wheels 54, with fluid, because particularly high fluid flows of the fluid arise in said regions. Furthermore, regions of the secondary chambers 6 to 8 with relatively narrow passage openings 9, 10 are particularly advantageously suitable for the introduction of fluid into the secondary chambers 6 to 8, because less fluid flows from the secondary chambers 6 to 8 into the conveying chamber 5 in these regions than in regions with relatively wide passage openings 9, 10, such that the introduced fluid can be distributed over greater regions of the secondary chambers 6 to 8.

Analogously to the first exemplary embodiment illustrated in FIG. 1, the exemplary embodiment shown in FIGS. 3 and 4 may also have a fluid circuit system 11 in order to control and optimize the fluid flow. FIGS. 4 to 7 show block diagrams of different embodiments of such fluid circuit systems 11.

The exemplary embodiment of a conveying installation 1 illustrated in FIGS. 3 and 4 may be modified in a variety of ways. For example, traction mechanisms 48 may be arranged below, above and/or to the side of the conveying chamber 5, and/or a different number of traction mechanisms 48 may be provided, for example only one traction mechanism 48. Furthermore, separate additional chambers 31, 32 for the drive wheels 54 may be omitted. Furthermore, the conveying path may also, instead of horizontally, run at an angle with respect to the horizontal, or may have a course which deviates from a straight course, for example a S-shaped or Z-shaped course, wherein the installation housing 3 is designed correspondingly to the course of the conveying path. Furthermore, the fluid outlet 17 may also be operated as a (further) fluid inlet.

Figure 5:
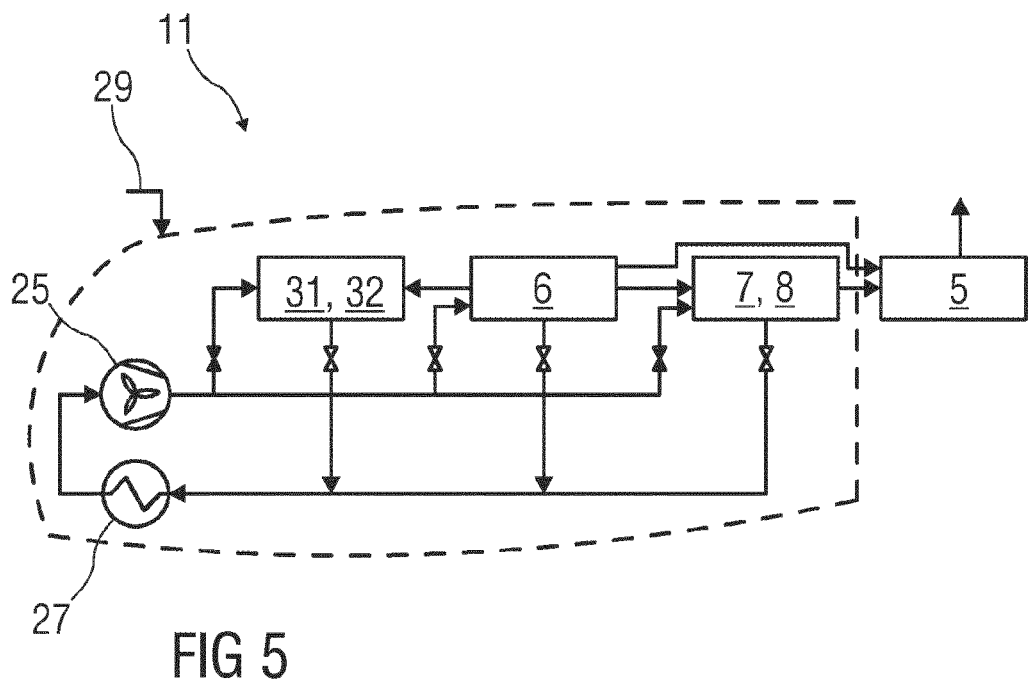
FIG. 5 shows a block diagram of a second exemplary embodiment of a fluid circuit system of a conveying installation.

FIG. 5 shows a fluid circuit system 11 into which the secondary chambers 6 to 8 and the additional chambers 31, 32 are integrated. The fluid circuit system 11 conducts fluid through each secondary chamber 6 to 8 and each additional chamber 31, 32, discharges fluid from the secondary chambers 6 to 8 and the additional chambers 31, 32, and conducts said fluid via a turbomachine 25 and optionally via a heat exchanger 27 back to the secondary chambers 6 to 8 and/or to the additional chambers 31, 32. Furthermore, fluid is conducted from the secondary chambers 6 to 8 through the passage openings 9, 10 into the conveying chamber 5. The fluid circuit system 11 has a fluid feed 29, through which fluid can be fed to the fluid circuit system 11, in particular in order to replace fluid that is discharged from the secondary chambers 6 to 8 through the passage openings 9, 10 into the conveying chamber 5. The first secondary chamber 6 has a higher fluid pressure than the other secondary chambers 7, 8, the additional chambers 31, 32 and the conveying chamber 5, such that fluid flows from the first secondary chamber 6 into the other secondary chambers 7, 8, the additional chambers 31, 32 and the conveying chamber 5. Furthermore, the second secondary chamber 7 and the third secondary chamber 8 have a higher fluid pressure than the conveying chamber 5, such that fluid flows from the second secondary chamber 7 and the third secondary chamber 8 into the conveying chamber 5.

Figure 6:
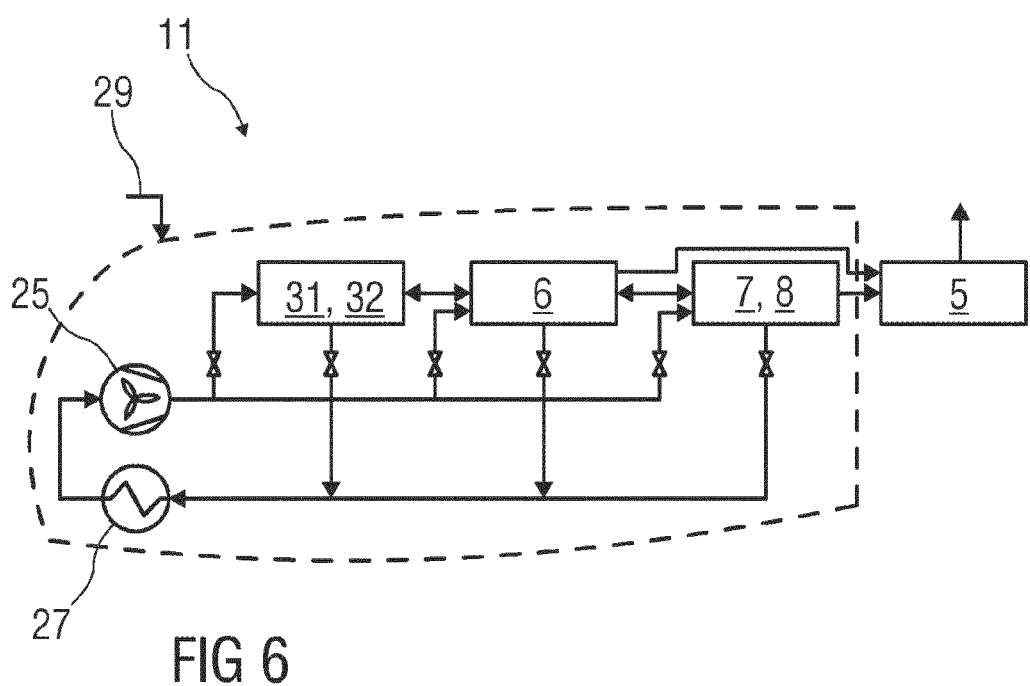
FIG. 6 shows a block diagram of a third exemplary embodiment of a fluid circuit system of a conveying installation.

FIG. 6 shows a fluid circuit system 11 which differs from the fluid circuit system 11 shown in FIG. 5 only in that the secondary chambers 6 to 8 and the additional chambers 31, 32 have an identical fluid pressure, such that fluid is exchanged between the secondary chambers 6 to 8 and the additional chambers 31, 32. The fluid pressure in the secondary chambers 6 to 8 is again higher than in the conveying chamber 5, such that fluid flows from each secondary chamber 6 to 8 into the conveying chamber 5.

Figure 7:
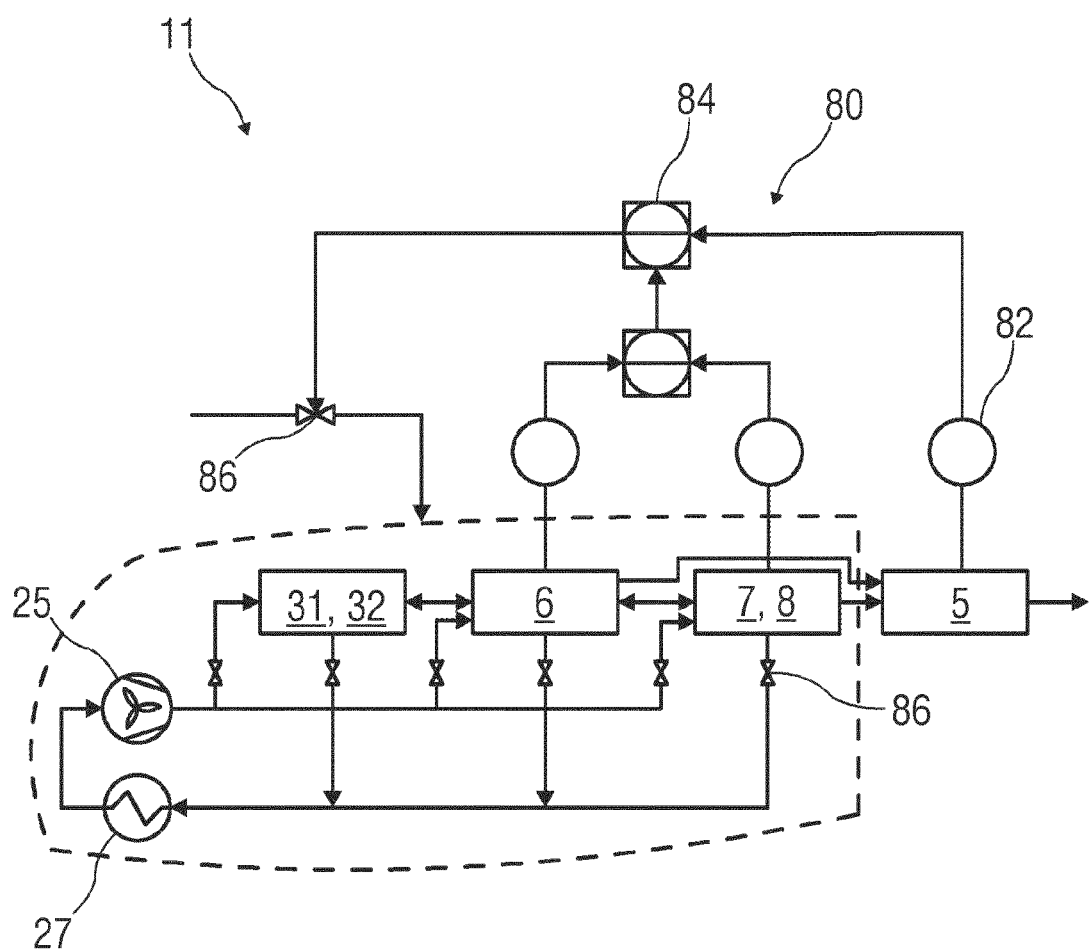
FIG. 7 shows a block diagram of a fourth exemplary embodiment of a fluid circuit system of a conveying installation.

FIG. 7 shows a fluid circuit system 11 which differs from the fluid circuit system 11 shown in FIG. 6 only by a closed-loop control system 80 for the closed-loop control of fluid flows between the secondary chambers 6 to 8 and the conveying chamber 5. The closed-loop control system 80 comprises pressure measuring devices 82 for detecting pressures in the secondary chambers 6 to 8 and the conveying chamber 5 and control units 84 for monitoring pressure differences between said pressures and for the closed-loop control of the fluid flows between the secondary chambers 6 to 8 and the conveying chamber 5 in a manner dependent on the pressure differences. The closed-loop control of the fluid flows is performed by means of an activation of control valves 86 of the fluid circuit system 11.

Figure 8:
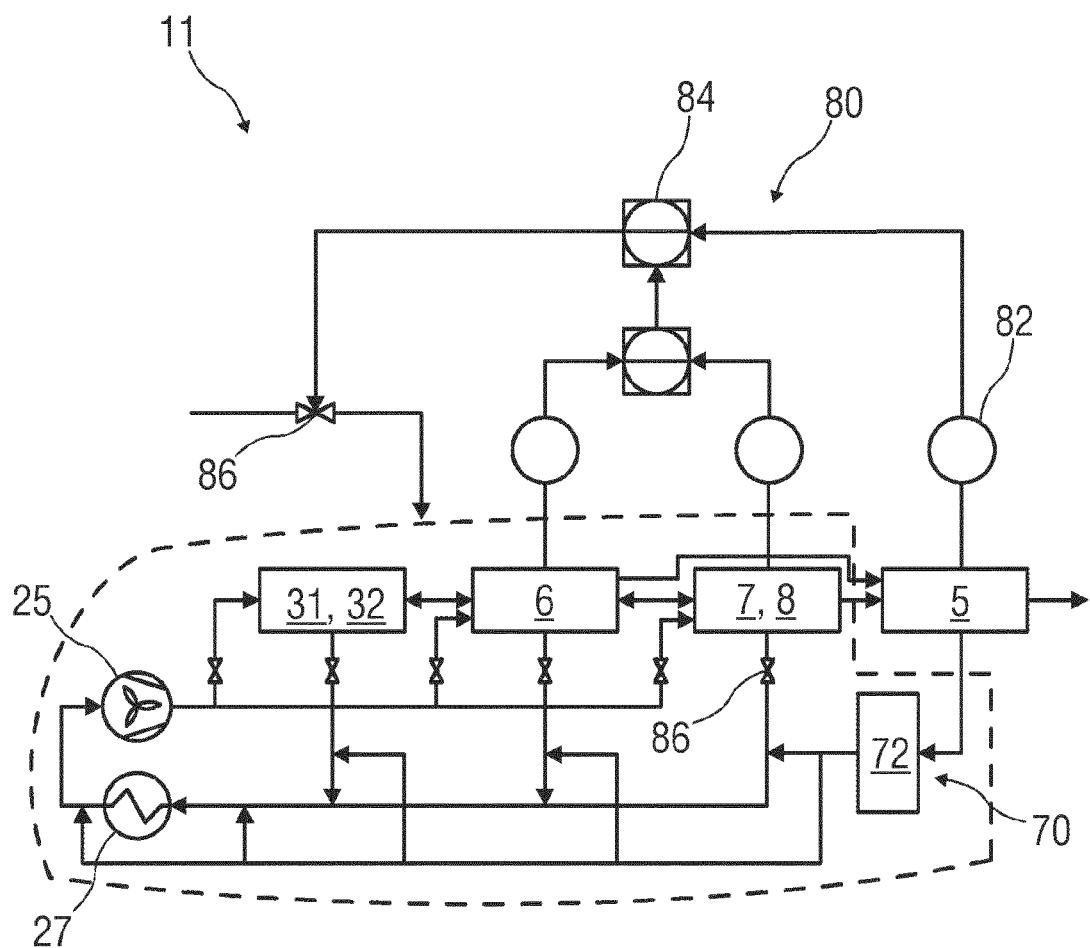
FIG. 8 shows a block diagram of a fifth exemplary embodiment of a fluid circuit system of a conveying installation.

FIG. 8 shows a fluid circuit system 11, which differs from the fluid circuit system 11 shown in FIG. 7 only in that fluid emerging from the conveying chamber 5 through fluid outlets 17, 19 is partially collected, and fed back to the fluid circuit system 11, by means of a fluid recycling unit 70. The fluid recycling unit 70 may optionally have a fluid cleaning unit 72, by means of which fluid that has emerged from the conveying chamber 5 is cleaned, for example of gas that has escaped from the material for conveying and/or of dust, before being fed to the fluid circuit system 11.

Figure 9:
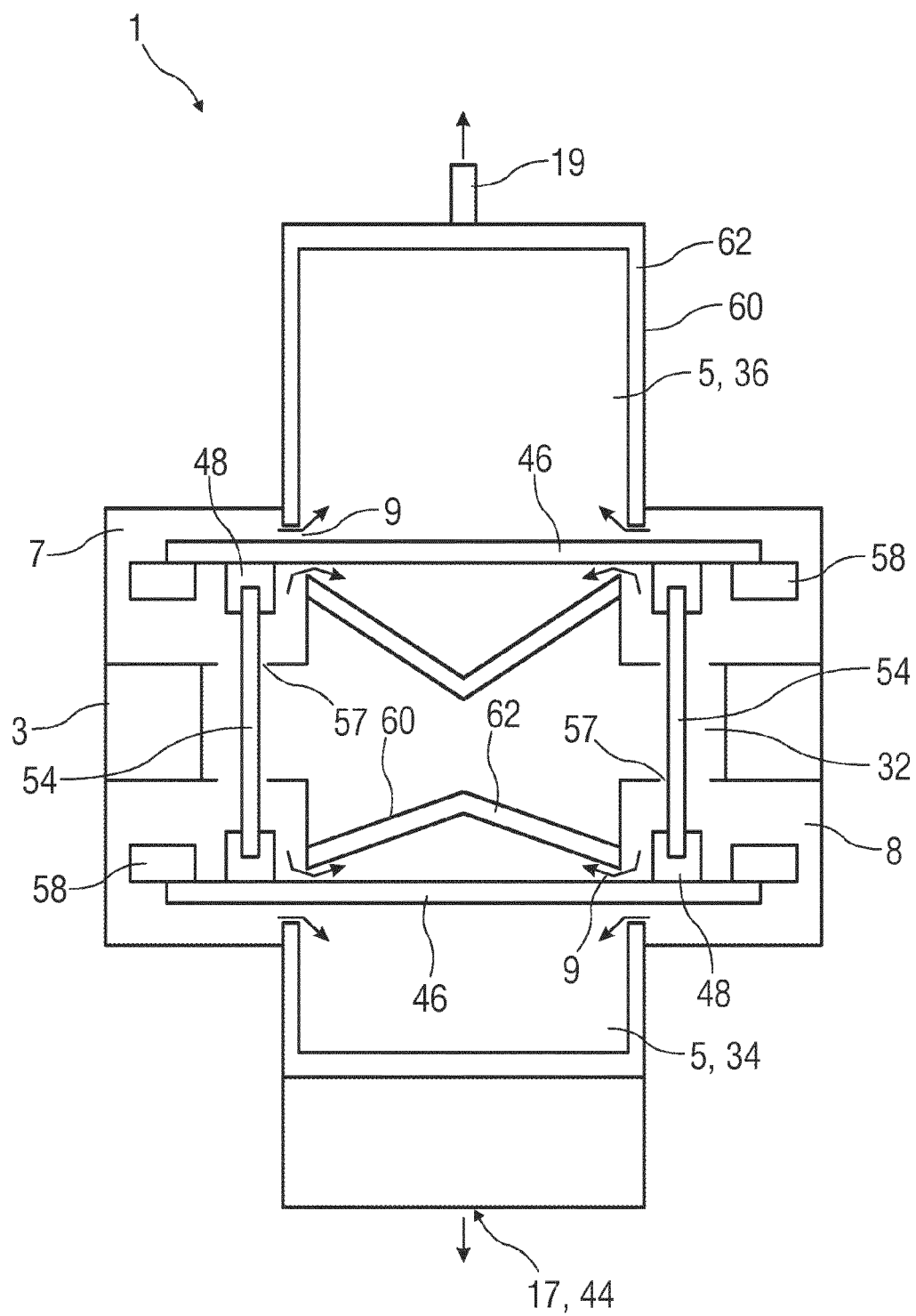
FIG. 9 shows a sectional illustration of a fourth exemplary embodiment of a conveying installation.

FIG. 9 shows a sectional illustration of a fourth exemplary embodiment of a conveying installation 1. This exemplary embodiment differs from the exemplary embodiment shown in FIGS. 3 and 4 substantially only in that the first secondary chamber 6 has been omitted and the conveying chamber 5 extends into a region which is occupied by the first secondary chamber 6 in the exemplary embodiment shown in FIGS. 3 and 4. The traction mechanisms 48, which in the exemplary embodiment shown in FIGS. 3 and 4 are arranged in the first secondary chamber 6, are arranged in the secondary chambers 7, 8 in the exemplary embodiment shown in FIG. 9, wherein a traction mechanism 48 is arranged in each of said secondary chambers 7, 8.

Analogously to the exemplary embodiment shown in FIGS. 3 and 4, the secondary chambers 7, 8 are each connected to the conveying chamber 5 by means of a slot-like passage opening 9 which runs in ring-shaped encircling fashion. The carrier elements 46 project through said passage openings 9 into the secondary chambers 7, 8. In the secondary chambers 7, 8, there are in each case again arranged guide wheels 58 by means of which the carrier elements 46 are guided.

Each traction mechanism 48 is, analogously to the exemplary embodiment shown in FIGS. 3 and 4, driven by means of two drive wheels 54, which are arranged in each case in a diverting region 50, 52 of the traction mechanism 48 and are in contact with the traction mechanism 48. At each diverting region 50, 52, there is again arranged an additional chamber 31, 32 in which the drive wheels 54 of said diverting region 50, 52 are arranged. Each additional chamber 31, 32 adjoins both secondary chambers 7, 8 and has, for each of the drive wheels 54 arranged therein, connecting openings 57 through which the drive wheel 54 projects into the respective secondary chamber 7, 8, in which the traction mechanism 48 connected to the drive wheel 54 is arranged.

By contrast to the exemplary embodiment shown in FIGS. 3 and 4, the carrier elements 46 do not delimit the conveying chamber 5, but rather are spaced apart from a conveying chamber wall 60 of the conveying chamber 5. The conveying chamber wall 60 may have a thermal insulation layer 62.

As a result of the relocation of the traction mechanisms 48 into the secondary chambers 7, 8, the construction of the installation housing 3 is simplified in relation to the exemplary embodiment shown in FIGS. 3 and 4 owing to the omission of the first secondary chamber 6, which, in that exemplary embodiment, forms a separate traction mechanism chamber for the traction mechanisms 48. Furthermore, the cooling of the traction mechanisms 48 in the case of transport of hot material for conveying is simplified. Specifically, it is firstly the case that the cooling of the first secondary chamber 6 is omitted. Secondly, in the case of transport of hot material for conveying, the traction mechanisms 48 are less intensely heated, and therefore also require less intense cooling, because the traction mechanisms 48 are arranged now no longer at a central region of the carrier elements 46, which is particularly intensely heated by the material for conveying, but rather at the relatively cool edge regions of the carrier elements 46, with a considerably greater spacing to the material for conveying.

As a result of the spacing of the carrier elements 46 from the conveying chamber wall 60, it is furthermore the case that a substantially homogeneous fluid atmosphere forms above and below the carrier elements 46, whereby it is advantageously the case in particular that temperature differences and turbulent flows within the conveying chamber 5 are reduced. The spacing of the carrier elements 46 from the conveying chamber wall 60 and thermal insulation of the conveying chamber wall 60 by means of the thermal insulation layer 62 furthermore advantageously reduce the heat losses from the conveying chamber 5, such that, in the case of transport of hot material for conveying, the temperature of the material for conveying can be more effectively kept at an approximately constant level along the conveying path.

The exemplary embodiment of a conveying installation 1 shown in FIG. 9 may for example be modified such that the additional chambers 31, 32 are omitted. For example, the secondary chambers 7, 8 may be enlarged, such that each drive wheel 54 is arranged in one secondary chamber 7, 8.

Furthermore, the installation housing 3 may be designed for discharging material for conveying that falls from carrier elements 46 during the conveyance along the conveying path, in order that the conveying chamber 5 does not gradually become blocked by material for conveying that falls from carrier elements 46. For this purpose, the base of the upper region of the conveying chamber 5 is, for example as in FIG. 9, of trough-like form and inclined relative to the horizontal, such that material for conveying that falls from carrier elements 46 can slide to a disposal opening in the conveying chamber wall 60, for example in the base of the upper region of the conveying chamber 5, and can be discharged from the conveying chamber 5 through the disposal opening. Alternatively, the base of the upper region of the conveying chamber 5 may also have one continuous disposal opening, under which there are arranged, for example, fluid-tight chutes via which material for conveying that falls from carrier elements 46 is disposed of. The installation housings 3 of conveying installations 1 that are shown in FIGS. 1 to 4 may also be similarly designed for discharging material for conveying that falls from carrier elements 46 during the conveyance along the conveying path.

Figure 10:
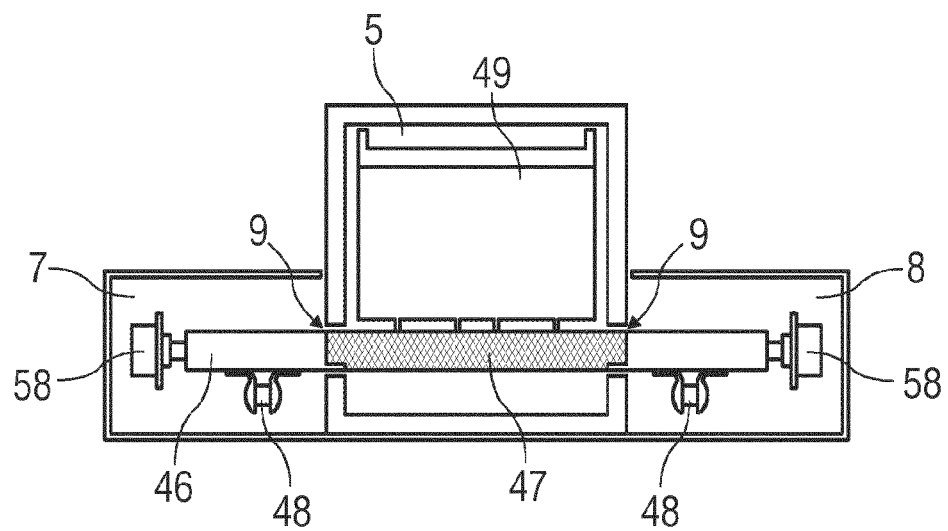
FIG. 10 shows a schematic sectional view of an exemplary embodiment of a conveying installation with carrier elements which are provided with a thermal insulation material within a conveying chamber and in the region of a passage opening.

FIG. 10 shows a schematic sectional view of a conveying installation 1 which can be substantially designed as in the previously described exemplary embodiments.

Analogously to the exemplary embodiment shown in FIGS. 3 and 4, the secondary chambers 7, 8 are each connected to the conveying chamber 5 by means of a slot-like passage opening 9 which runs in ring-shaped encircling fashion. The carrier elements 46 project through said passage openings 9 into the secondary chambers 7, 8. In the secondary chambers 7, 8, there are in each case again arranged guide wheels 58 by means of which the carrier elements 46 are guided. Furthermore, traction mechanisms 48 for driving the carrier elements 46 are provided. The material for conveying is transported, for example, directly by the carrier elements 46 or in containers 49 arranged on the carrier elements 46.

The surfaces of the carrier elements 46 within the conveying chamber 5 and in the region of the passage opening 9 are provided with a thermal insulation material 47.

Figure 11:
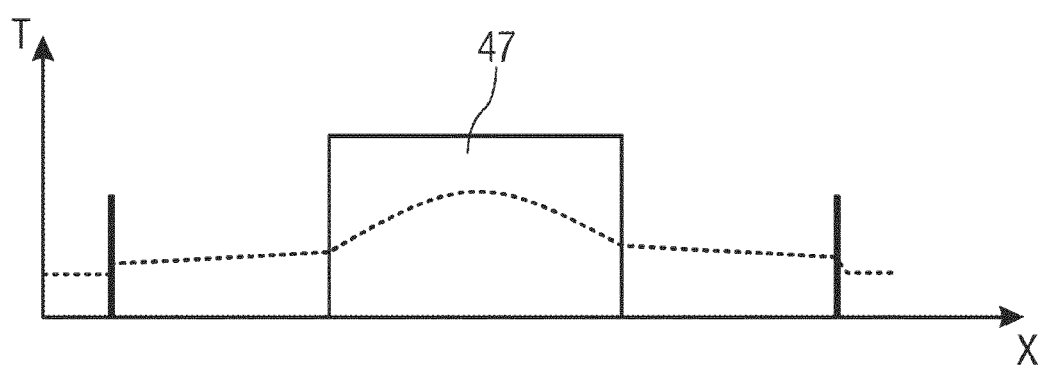
FIG. 11 shows a profile of a temperature in the material of the carrier element from FIG. 10 along a main axis of the carrier element.

As a result of the thermal insulation, a profile of a temperature T arises in the material of the carrier element 46 along a main axis x of the carrier element 46, as shown in FIG. 11.

Figure 12:
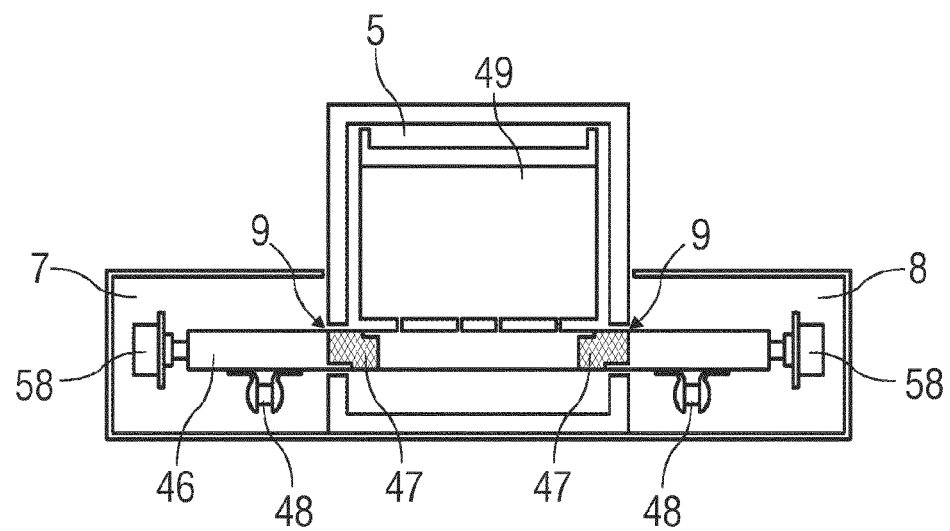
FIG. 12 shows a schematic sectional view of an exemplary embodiment of a conveying installation with carrier elements which are provided with a thermal insulation material in the region of a passage opening and adjacent thereto.

FIG. 12 shows a schematic sectional view of a conveying installation 1 which can be substantially designed as in the previously described exemplary embodiments.

Analogously to the exemplary embodiment shown in FIGS. 3 and 4, the secondary chambers 7, 8 are each connected to the conveying chamber 5 by means of a slot-like passage opening 9 which runs in ring-shaped encircling fashion. The carrier elements 46 project through said passage openings 9 into the secondary chambers 7, 8. In the secondary chambers 7, 8, there are in each case again arranged guide wheels 58 by means of which the carrier elements 46 are guided. Furthermore, traction mechanisms 48 are provided for driving the carrier elements 46. The material for conveying is transported, for example, directly by the carrier elements 46 or in containers 49 arranged on the carrier elements 46.

The surfaces of the carrier elements 46 in the region of the passage opening 9 and an adjoining region within the conveying chamber 5 are provided with a thermal insulation material 47, but not in such a manner that the entire surface of the carrier elements 46 within the conveying chamber 5 is provided with the thermal insulation material 47.

Figure 13:
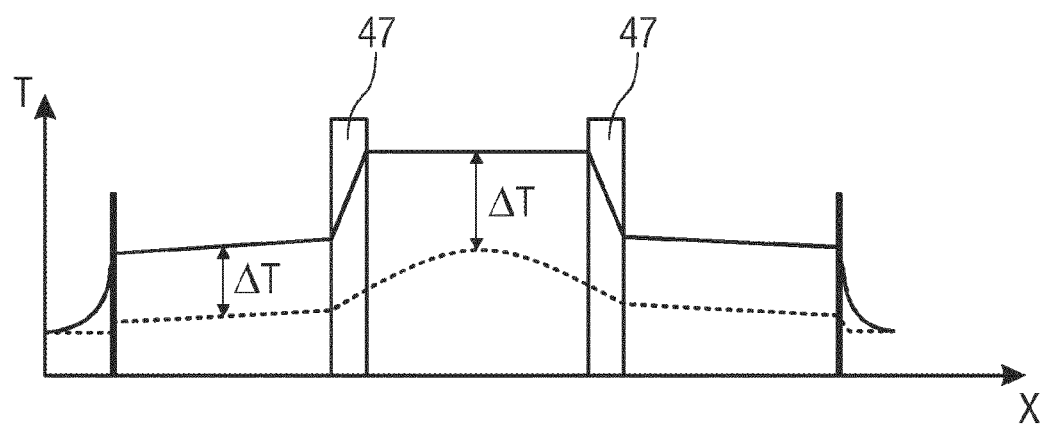
FIG. 13 shows a profile of a temperature in the material of the carrier element from FIG. 12 along a main axis of the carrier element.

As a result of the thermal insulation, a profile of a temperature T arises in the material of the carrier element 46 along a main axis x of the carrier element 46, as shown in FIG. 13.

The carrier elements 46 which are shown in the exemplary embodiments of FIGS. 10 and 12 and are provided with a thermal insulation material 47 are useable in each of the previously described exemplary embodiments.

By means of the thermal insulation material 47 used on the surfaces of the carrier elements 46, the heat input into the carrier elements 46 from the hot material for conveying is reduced, and therefore the thermal loading of the bearings and traction mechanisms 48 is also reduced.

Although the invention has been illustrated and described in more detail on the basis of preferred exemplary embodiments, the invention is not restricted by the disclosed examples, and other variations may be derived from these by a person skilled in the art without departing from the scope of protection of the invention.

Conveying installations can also be designed corresponding to the variants of conveying installations that are shown in FIGS. 1 to 10, but without fluid circuit systems.

LIST OF REFERENCE DESIGNATIONS

1 Conveying installation
3 Installation housing
5 Conveying chamber
6 to 8 Secondary chamber
9, 10 Passage opening
11 Fluid circuit system
13, 15 Conveying chamber end
17 to 19 Fluid outlet
21, 22 Fluid inlet
25 Turbomachine
27 Heat exchanger
29 Fluid feed
31, 32 Additional chamber
34, 36 Horizontal portion
38, 40 Vertical portion
42 Charging inlet
44 Discharge opening
46 Carrier element
47 Thermal insulation material
48 Traction mechanism
49 Container
50, 52 Diverting region
54 Drive wheel
56, 57 Connecting opening
58 Guide wheel
60 Conveying chamber wall
62 Heat insulation layer
70 Fluid recycling unit
72 Fluid cleaning unit
80 Closed-loop control system
82 Pressure measuring device
84 Control unit
86 Control valve
T Temperature x
Main axis

The invention claimed is:

1. A conveying installation for conveying a material along a conveying path, comprising:
   a conveying chamber through which the conveying path passes; and
   at least one component of a conveying mechanism for conveying the material arranged at least outside the conveying chamber;
   wherein the conveying mechanism has a traction mechanism drive with at least one traction mechanism by which carrier elements are movable in order to convey the material;
   wherein the carrier elements are arranged in the conveying chamber and protrude out of the conveying chamber through at least one passage opening;
   wherein at least parts of the conveying installation at least within at least one of the conveying chamber and in a region of the passage opening are at least partially provided with a thermal insulation material;
   wherein at least one of:
   surfaces of the carrier elements at least within at least one of the conveying chamber and in the region of the passage opening are at least partially provided with a thermal insulation material, and
   at least one container for receiving the material for conveying is arranged on at least one of the carrier elements;
   wherein at least one of a surface and an inner surface of the container is at least partially provided with a thermal insulation material;
   wherein a secondary chamber is provided which is connected to the conveying chamber by the at least one passage opening; and
   wherein the carrier elements protrude through the at least one passage opening into the secondary chamber and the at least one traction mechanism is arranged in the secondary chamber.

2. The conveying installation as claimed in claim 1, wherein a separating surface between a surface of the conveying chamber within the conveying chamber and at least one adjacent outer surface of the conveying chamber is at least partially provided with the thermal insulation material.

3. The conveying installation as claimed in claim 1, wherein the surfaces of the conveying chamber are at least partially provided with the thermal insulation material toward an environment.

4. The conveying installation as claimed in claim 1, wherein surfaces of the carrier elements outside the conveying chamber are not provided with a thermal insulation material.

5. The conveying installation as claimed in claim 1, wherein surfaces of the carrier elements outside the conveying chamber are at least partially provided with a thermal insulation material.

6. The conveying installation as claimed in claim 1, wherein the secondary chamber has a fluid atmosphere differing at least one of physically and chemically from a fluid atmosphere in the conveying chamber.

7. The conveying installation as claimed in claim 1, wherein at least one of the conveying chamber and the secondary chamber are part of an installation housing and the installation housing has at least one fluid inlet and at least one fluid outlet and, apart from the at least one fluid inlet and the at least one fluid outlet, is designed to be fluid-tight or approximately fluid-tight.

8. The conveying installation as claimed in claim 1, wherein the carrier elements at least partially separate the conveying chamber from the secondary chamber, in which the at least one traction mechanism is arranged.

9. The conveying installation as claimed in claim 1, further comprising one of a fluid infeed and a fluid circuit system, the one of the fluid infeed and the fluid circuit system comprising the secondary chamber configured for conducting a fluid through the at least one passage opening between the secondary chamber and the conveying chamber.

10. The conveying installation as claimed in claim 1, wherein a fluid circuit system is not provided.

11. The conveying installation as claimed in claim 1, wherein surfaces of the carrier elements are at least partially provided with the thermal insulation material on their top side and their bottom side.

12. The conveying installation as claimed in claim 1, wherein surfaces of the secondary chamber are connected to the conveying chamber via thermally insulated surfaces.

13. The conveying installation as claimed in claim 12, wherein the thermally insulated surfaces limit a heat input into an atmosphere of the secondary chamber.

* * * * *